GERALD A. McFARREN
INVENTOR

BY

ATTORNEY

United States Patent Office 3,575,764
Patented Apr. 20, 1971

3,575,764
BONDING FABRICS
Gerald A. McFarren, Winterbury, Wilmington, Del., assignor to Hercules Incorporated, Wilmington, Del.
Filed Mar. 3, 1969, Ser. No. 803,704
Int. Cl. C09j 5/06
U.S. Cl. 156—309　　　　　　　　　　　　　　7 Claims

ABSTRACT OF THE DISCLOSURE

Air-pervious fabric structures can be prepared by bonding the fibers in nonwovens or bonding fabrics to form laminates using as the bonding material oriented thermoplastic films having an overall melt embossed pattern.

---

This invention relates to a method of preparing fabric structures. More particularly, this invention relates to an improved method of bonding the fibers in nonwoven fabrics and bonding fabrics to form laminates using melt embossed oriented thermoplastic films.

It is known to bond the fibers in nonwovens and to laminate fabrics using continuous sheets or films of thermoplastic material. However, the resulting products while having increased strength and integrity are stiff and impermeable to air. It is also known to bond the fibers in nonwovens and to laminate fabrics using an open network thermoplastic sheet. While the resulting products have excellent properties, the open network thermoplastic sheets are difficult to prepare and expensive.

It is an object of this invention, therefore, to provide an improved method of preparing air-pervious bonded nonwovens and fabric laminates which are strong and flexible with good drape and a soft hand.

It is a further object of this invention to provide an improved method of preparing bonded nonwovens and fabric laminates which are air-pervious without using the expensive open network thermoplastic sheets.

Now in accordance with this invention, these objectives and others have been achieved by bonding the fibers in nonwovens and bonding fabrics to form laminates by the use of certain specific oriented thermoplastic films having an overall melt embossed pattern. The term "overall melt embossed pattern" means that the film has a repeating pattern of thickened areas formed during a period when the thermoplastic is in the molten state. In order to obtain air-pervious products having a soft hand and good drape properties, the melt embossed pattern must follow certain criteria. The thin sections of the film must be less than about 2 mils, most preferably less than about 0.6 mil. The thick sections of the embossed film must be at least about 6 mils, most preferably at least about 8 mils. The ratio of the thickness of the thin section to the thickness of the thick section must be at least about 1:4, most preferably at least about 1:12. Each thick section should be at least 0.04 inch but no further than 1 inch from the next nearest thick section.

The nonwoven webs to be bonded and the fabrics to be laminated in accordance with the process of this invention can be of any material which is suitable for the purpose for which said nonwovens and laminates are to be used. Exemplary of the fabrics which can be used are woven, knitted and nonwoven cotton; wool; polyolefins such as polypropylene; regenerated cellulose; cellulose acetate; polyamides; acrylates; vinyls; and polyesters. In the case of the nonwovens various types of webs such as carded, garneted or random laid webs can be used.

Any biaxial or uniaxial oriented thermoplastic film having an overall melt embossed pattern can be employed in the process of this invention, provided that it meets the criteria described above and further provided that it melts at a temperature below the temperature at which the fibers of the nonwoven web or fabric to be bonded or laminated, melt or otherwise become degraded. Thus, it can be seen that the choice of thermoplastic film depends upon the fibers in the nonwoven web or fabric. For example, when laminating acetate tricot the thermoplastic used must have a melting point below about 190° C. On the other hand thermoplastics having much higher melting points can be used when bonding or laminating cottons. The choice of thermoplastic film to be used with any specific fabric or nonwoven will be readily apparent to those skilled in the art. Preferred thermoplastics are polyethylene, polypropylene, polyesters, polyamides, ethylene copolymers such as ethylene-propylene copolymers, ethylene-vinyl acetate copolymers, and ethylene-methyl acrylate copolymers.

Various embossed configurations within the criteria set forth above can be employed. Preferably, the embossed configuration will be such as to result in uniform spots or globs of thermoplastic material when the embossed sheet is heated to its melting point. Typical configurations are shown by way of example in FIGS. 1–8.

Figure 1:
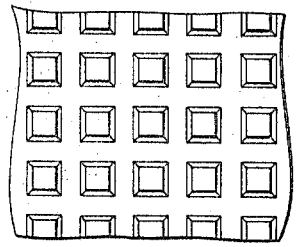
FIG. 1 shows in plan, to enlarged scale, a portion of a thermoplastic sheet having square bosses.
Figure 3:
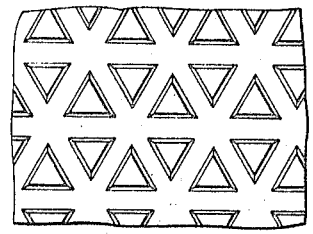
FIG. 3 shows in plan and FIG. 4 in a fragmentary perspective view another thermoplastic sheet having triangular bosses.

It will be readily apparent to those skilled in the art that innumerable other configurations can be employed in the process of this invention. The desired configuration as stated above is one which results in uniformly spaced spots or globs of melted thermoplastic material when the sheet is heated. In general the sheets will weigh from about 0.3 ounce per square yard to about 2 ounces per square yard.

The embossed thermoplastic sheets employed in the process of this invention can be formed in many ways, including extruding a flat, molten film of thermoplastic between the nips of two steel rolls, one or both of which have an engraved surface the reverse of that desired on the film. The orientation of the thus embossed film can be accomplished in the usual manner, using machine direction rolls and a tenter for biaxially drawn films, and only machine direction draw rolls for uniaxially drawn films. Other methods of preparing the embossed oriented films will be obvious to those skilled in the art.

As indicated above the process of this invention comprises heating the embossed film in close contact with a nonwoven web or between fabric plies to be laminated at a temperature sufficiently high to melt the said thermoplastic but not high enough to melt or otherwise damage the fibers in the nonwoven or fabric. In the case of bonding the fibers in nonwovens, the process can be carried out by merely heating the nonwoven web in close contact with the embossed film. In the case of laminates the film is placed between the fabric plies or nonwoven webs to be laminated.

The temperature at which the thermoplastic film and either nonwoven web or fabric are heated will depend upon the melting point of the specific thermoplastic employed, the specific nonwoven web or fabric, the thickness of the structure, the period of time the structure is to be heated, etc. In general the temperature of heating will be from about 125° C. to about 225° C. and the period time the materials will be subjected to heat will be from about 1 second to about 1 minute. In order to keep the film in close contact with the nonwoven web or fabric, it is desirable to keep the structure under pressure of at least 0.2 p.s.i. while heating.

The process of this invention can be conducted by various methods. For example, the materials can merely be heated in a press or passed through the nip of heated rollers or passed over a large heated roller or subjected to hot gases. When using hot gas, the structure can be pressed between metal screens or in continuous operations passed over a perforated or screen drum while passing hot gases therethrough.

The reinforced fabrics of this invention have a variety of uses. For example, the reinforced nonwovens can be used for liner fabrics, filter cloths, shade cloths for crops, backing fabrics for tufted structures and disposable fabrics (e.g. surgical dressings, bed sheets, pillow coverings, surgical gowns, etc.).

The following examples will serve to illustrate the invention.

EXAMPLE 1

Figure 2:
FIG. 2 shows in elevation the configuration of FIG. 1.
Figure 4:
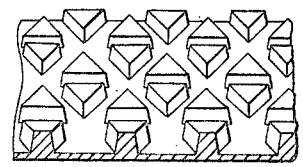
Figure 5:
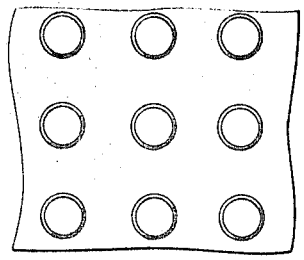
FIG. 5 shows in plan and FIG. 6 in side elevation a thermoplastic sheet having a hobnail type configuration.

An 8 inch square biaxially oriented embossed sheet of isotactic polypropylene 0.5 mil thick at the thinnest points and 6 mils thick at the thickest points, having a configuration as shown in FIGS. 1 and 2, a weight of approximately 0.7 ounce per square yard and containing approximately 45 squares per square inch was placed between similar size pieces of woven cotton sheeting having a weight of approximately 3 ounces per square yard. The resulting sandwich-like structure was pressed against a smooth metal surface for 20 seconds using a calculated 0.6 p.s.i. pressure at a temperature of 216° C. The resulting laminate was strong and air-pervious having a T-peel strength (A.S.T.M. No. 1876) of approximately 15 ounces per inch of width when tested at room temperature on a 1 inch wide sample.

EXAMPLE 2

Figure 7:
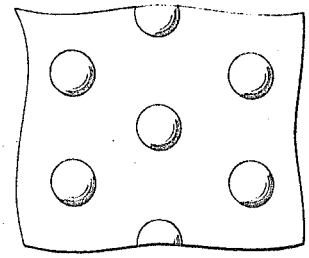
FIG. 7 shows in plan and FIG. 8 in elevation another thermoplastic sheet having a hobnail type configuration.
Figure 6:
Figure 8:

An 8 inch square biaxially oriented embossed sheet of high density polyethylene having a configuration as shown in FIGS. 7 and 8, a weight of approximately 0.5 ounce per square yard and containing approximately 60 bosses per square inch was placed between similar size pieces of 1.8 ounce per square yard acetate tricot. The bosses on the thermoplastic embossed film were 40 mils in diameter, 120 mils apart, and 15 mils thick. The thin section of the film was 0.2 to 0.4 mil in thickness. The polyethylene in said thermoplastic sheet had a melt index of 6 at 190° C. The resulting sandwich like structure was pressed against a smooth metal surface for 15 seconds using 1.5 p.s.i. and a temperature of 400° F. The resulting laminate was strong and air permeable with a soft hand. On tearing the laminate apart it could be seen that the thermoplastic film had melted into small regularly spaced thermoplastic globs.

EXAMPLE 3

An 8 inch square uniaxially oriented embossed thermoplastic sheet of high density polyethylene having a configuration as shown in FIGS. 7 and 8, a weight of approximately 0.7 ounce per square yard and containing approximately 80 bosses per square inch was placed between similar size pieces of acetate tricot as described in Example 2. The embossed thermoplastic film had been drawn perpendicular to the lengthwise direction of the embossed pattern and was 0.8 mil in thickness in the thinner section with 15 ml. thick bosses. The bosses were 40 mils in diameter and 100 mils apart. The resulting sandwich structure was laminated as described in Example 2. The resulting laminate was strong, air-pervious and had a good hand.

EXAMPLE 4

An 8 inch square uniaxially oriented embossed thermoplastic sheet of low density polyethylene having a configuration as shown in FIGS. 7 and 8, a weight of approximately 0.5 ounce per square yard and containing approximately 16 bosses per square inch was placed in contact with a similar size piece of loose sisal-garnet web having a weight of approximately 3 ounces per square yard. The embossed thermoplastic film had been drawn perpendicular to the lengthwise direction of the embossed pattern and was 0.7 mil in thickness in the thinner section with 13 ml. thick bosses. The bosses were 80 mils in diameter and about $9/16$ inch apart. The resulting structure was pressed against a smooth metal surface for 30 seconds using 0.6 p.s.i. and a temperature of 375° F. The resulting bonded nonwoven was air permeable with a tensile strength of 6 lbs. per inch width in both directions.

What I claim and desire to protect by Letters Patent is:

1. In the process of preparing air-previous fabric structures selected from bonded nonwoven fabrics and fabric laminates which comprises bonding the fibers in nonwoven webs and bonding fabrics to form laminates with a thermoplastic bonding material which melts at a temperature below the temperature at which the fabric is affected, the improvement of using an oriented thermoplastic film having an overall melt embossed pattern wherein the thinnest sections of said film are less than about 2 mils, the thick sections are at least about 6 mils and the ratio of the thin sections to thick sections is at least about 1:4.

2. The process of claim 1 wherein the air-pervious fabric is a bonded nonwoven fabric.

3. The process of claim 1 wherein the air-pervious fabric is a fabric laminate.

4. The process of claim 1 wherein the oriented thermoplastic film has been uniaxially oriented.

5. The process of claim 1 wherein the oriented thermoplastic has been uniaxially oriented.

6. The process of claim 1 wherein the thermoplastic film is a film of polypropylene.

7. The process of claim 1 wherein the thermoplastic film is a film of high density polyethylene.

References Cited

UNITED STATES PATENTS

| | | | |
|---|---|---|---|
| 2,523,022 | 9/1950 | Horstman | 156—309X |
| 2,642,370 | 6/1953 | Parsons et al. | 156—309X |
| 3,485,705 | 12/1969 | Harmon | 156—309X |

REUBEN EPSTEIN, Primary Examiner

U.S. Cl. X.R.

161—88, 156; 156—306; 28—73

PO-1050
(5/69)

UNITED STATES PATENT OFFICE
CERTIFICATE OF CORRECTION

Patent No. __3,575,764__  Dated __April 20, 1971__

Inventor(s) ___Gerald A. McFarren (Case 8)___

It is certified that error appears in the above-identified patent and that said Letters Patent are hereby corrected as shown below:

Claim 1, line 28, "air-previous" should read
      -- air-pervious --.

Claim 4, line 45, " uniaxially " should read
      -- biaxially --.

Claim 5, line 47, after " plastic " insert
      -- film --.

Signed and sealed this 7th day of September 1971.

(SEAL)
Attest:

EDWARD M. FLETCHER, JR.
Attesting Officer

ROBERT GOTTSCHALK
Acting Commissioner of Pat